(12) United States Patent
Byun et al.

(10) Patent No.: US 10,446,802 B2
(45) Date of Patent: Oct. 15, 2019

(54) CURVED SECONDARY BATTERY AND METHOD OF MANUFACTURING THE SAME

(71) Applicant: SAMSUNG SDI CO., LTD., Yongin-si, Gyeonggi-do (KR)

(72) Inventors: In-Seop Byun, Yongin-si (KR); Junhee Han, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 751 days.

(21) Appl. No.: 14/710,298

(22) Filed: May 12, 2015

(65) Prior Publication Data

US 2016/0043355 A1    Feb. 11, 2016

(30) Foreign Application Priority Data

Aug. 11, 2014   (KR) .................. 10-2014-0103946

(51) Int. Cl.
*H01M 2/02*       (2006.01)
*H01M 10/052*   (2010.01)
*H01M 4/02*       (2006.01)

(52) U.S. Cl.
CPC ......... *H01M 2/0202* (2013.01); *H01M 2/021* (2013.01); *H01M 2/0207* (2013.01);
(Continued)

(58) Field of Classification Search
CPC .................................................. H01M 2/0207
See application file for complete search history.

(56) References Cited

U.S. PATENT DOCUMENTS 7,163,762 B2    1/2007   Endo et al.
7,595,132 B2    9/2009   Kang et al.
(Continued)

FOREIGN PATENT DOCUMENTS

EP    1 804 315 A2    7/2007
JP    11-307130 A     11/1999
(Continued)

OTHER PUBLICATIONS

Search Report dated Dec. 17, 2015 in corresponding European Patent Application No. 15178535.9.
(Continued)

*Primary Examiner* — Daniel S Gatewood
(74) *Attorney, Agent, or Firm* — Lee & Morse, P.C.

(57) ABSTRACT

A curved secondary battery and a method of manufacturing the same, the curved secondary battery including an electrode assembly having a curved shape; and a pouch that accommodates the electrode assembly, wherein the pouch includes a first encapsulation sheet on a curved first surface of the electrode assembly, the first encapsulation sheet having a portion with a same curvature as the first surface; a second encapsulation sheet on a curved second surface of the electrode assembly, the second encapsulation sheet having a portion with a same curvature as the second surface; and an attaching portion that has a planar shape, the attaching portion being formed when a first boundary portion of the first encapsulation sheet and a second boundary portion of the second encapsulation sheet are attached to each other.

18 Claims, 4 Drawing Sheets

(52) U.S. Cl.
CPC ....... *H01M 2/0275* (2013.01); *H01M 10/052* (2013.01); *H01M 2002/0205* (2013.01); *H01M 2004/025* (2013.01); *H01M 2220/30* (2013.01)

(56) References Cited

U.S. PATENT DOCUMENTS

| | | |
|---|---|---|
| 2003/0039883 A1 | 2/2003 | Notten et al. |
| 2003/0108787 A1 | 6/2003 | Endo et al. |
| 2006/0083981 A1* | 4/2006 | Mori .................... B32B 15/013 429/164 |
| 2012/0183825 A1 | 7/2012 | Lee et al. |

FOREIGN PATENT DOCUMENTS

| | | |
|---|---|---|
| JP | 2003-187759 A | 7/2003 |
| JP | 2007-520043 A | 7/2007 |
| JP | 2012-151110 A | 8/2012 |
| JP | 2012-248381 A | 12/2012 |
| JP | 2015-176789 A | 10/2015 |
| KR | 2002-0077388 A | 10/2002 |
| KR | 2004-0032965 A | 4/2004 |
| KR | 2012-0024108 A | 3/2012 |
| WO | WO 01/082393 A2 | 11/2001 |
| WO | WO 02/43178 A1 | 5/2002 |

OTHER PUBLICATIONS

Office Action issued by the Japanese Patent Office dated Mar. 19, 2019 in the examination of the Japanese Patent Application No. 2015-121980.

Office Action issued by the Chinese Patent Office dated Jun. 11, 2019 in the examination of the Chinese Patent Application No. 201510394235.8.

* cited by examiner

CURVED SECONDARY BATTERY AND METHOD OF MANUFACTURING THE SAME

CROSS-REFERENCE TO RELATED APPLICATION

Korean Patent Application No. 10-2014-0103946, filed on Aug. 11, 2014, in the Korean Intellectual Property Office, and entitled: "Curved Secondary Battery and Method of Manufacturing the Same," is incorporated by reference herein in its entirety.

BACKGROUND

1. Field

Embodiments relate to a curved secondary battery and a method of manufacturing the same.

2. Description of the Related Art

Unlike primary batteries which are not rechargeable, secondary batteries may be repeatedly charged and discharged. Thus, use thereof has been encouraged for economic and environmental reasons. Various electronic devices using secondary batteries have been developed, and design factors for manufacturing such electronic devices have become an important factor for purchasing the electronic devices.

SUMMARY

Embodiments are directed to a curved secondary battery and a method of manufacturing the same.

The embodiments may be realized by providing a curved secondary battery including an electrode assembly having a curved shape; and a pouch that accommodates the electrode assembly, wherein the pouch includes a first encapsulation sheet on a curved first surface of the electrode assembly, the first encapsulation sheet having a portion with a same curvature as the first surface; a second encapsulation sheet on a curved second surface of the electrode assembly, the second encapsulation sheet having a portion with a same curvature as the second surface; and an attaching portion that has a planar shape, the attaching portion being formed when a first boundary portion of the first encapsulation sheet and a second boundary portion of the second encapsulation sheet are attached to each other.

The attaching portion may be in a plane between the first surface of the electrode assembly and the second surface of the electrode assembly.

The first encapsulation sheet may include a first accommodation portion, the second encapsulation sheet may include a second accommodation portion, and the electrode assembly may be accommodated in the first accommodation portion and the second accommodation portion.

The first accommodation portion and the second accommodation portion may have a shape complementary to that of the electrode assembly.

The first boundary portion may be planar and may extend outwardly from a peripheral portion of the first accommodation portion, and the second boundary portion may be planar and may extend outwardly from a peripheral portion of the second accommodation portion.

The attaching portion may be bent in a direction perpendicular to a lengthwise direction of the electrode assembly.

The curved secondary battery may further include a first electrode tab and a second electrode tab that are electrically connected to the electrode assembly, wherein the first electrode tab and the second electrode tab pass through the attaching portion to be exposed to the outside, and the first electrode tab and the second electrode tab protrude from the electrode assembly at a position that is aligned with the attaching portion.

The electrode assembly may include a first electrode plate, a second electrode plate, and a separator between the first electrode plate and the second electrode plate, the first electrode tab may be attached to the first electrode plate, and the second electrode tab may be attached to the second electrode plate.

A side of the first encapsulation sheet may be continuous with a side of the second encapsulation sheet The embodiments may be realized by providing a method of manufacturing a curved secondary battery, the method including preparing an electrode assembly such that the electrode assembly has a curvature; forming a first encapsulation sheet that has a portion with a same curvature as a curved first surface of the electrode assembly; forming a second encapsulation sheet that has a portion with a same curvature as a curved second surface of the electrode assembly; disposing the electrode assembly between the first encapsulation sheet and the second encapsulation sheet; and attaching a first boundary portion of the first encapsulation sheet and a second boundary portion of the second encapsulation sheet, wherein an attaching portion, which is formed when the first boundary portion and the second boundary portion are attached to each other, is planar.

The attaching portion may be in a plane between the first surface of the electrode assembly and the second surface of the electrode assembly.

Forming the first encapsulation sheet may include forming a first accommodation portion thereon, forming the second encapsulation sheet may include forming a second accommodation portion thereon, and disposing the electrode assembly between the first encapsulation sheet and the second encapsulation sheet may include accommodating the electrode assembly in the first accommodation portion and the second accommodation portion.

The first accommodation portion and the second accommodation portion may have a shape complementary to that of the electrode assembly.

The first boundary portion may be planar and may extend outwardly from a peripheral portion of the first accommodation portion to the outside, and the second boundary portion may be planar and may extend outwardly from a peripheral portion of the second accommodation portion.

The method may further include bending the attaching portion in a direction perpendicular to a lengthwise direction of the electrode assembly.

The electrode assembly may include a first electrode plate, a second electrode plate, and a separator between the first electrode plate and the second electrode plate, a first electrode tab may be attached to the first electrode plate, and a second electrode tab may be attached to the second electrode plate.

The first electrode tab and the second electrode tab may protrude from the electrode assembly at a position that is aligned with the attaching portion.

A side of the first encapsulation sheet may be continuous with a side of the second encapsulation sheet.

The side of the first encapsulation sheet and the side of the second encapsulation sheet may form a folding line, and the first encapsulation sheet and the second encapsulation sheet may be folded with respect to the folding line such that the first encapsulation sheet and the second encapsulation sheet overlap each other.

Attaching the first boundary portion and the second boundary portion may include thermally fusing the first boundary portion of the first encapsulation sheet and the second boundary portion of the second encapsulation sheet.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
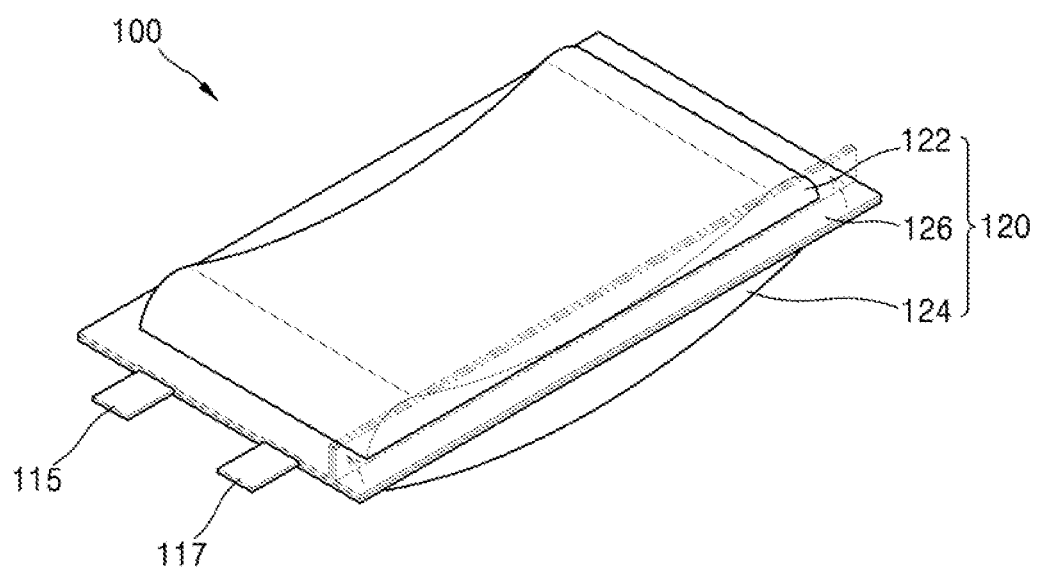
FIG. 1 illustrates a schematic perspective view of a curved secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, the term "and/or" includes any and all combinations of one or more of the associated listed items.

While such terms as "first," "second," etc., may be used to describe various components, such components must not be limited to the above terms. The above terms are used only to distinguish one component from another.

An expression used in the singular encompasses the expression of the plural, unless it has a clearly different meaning in the context. In the present specification, it is to be understood that the terms such as "including", "comprising," or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Figure 2A:
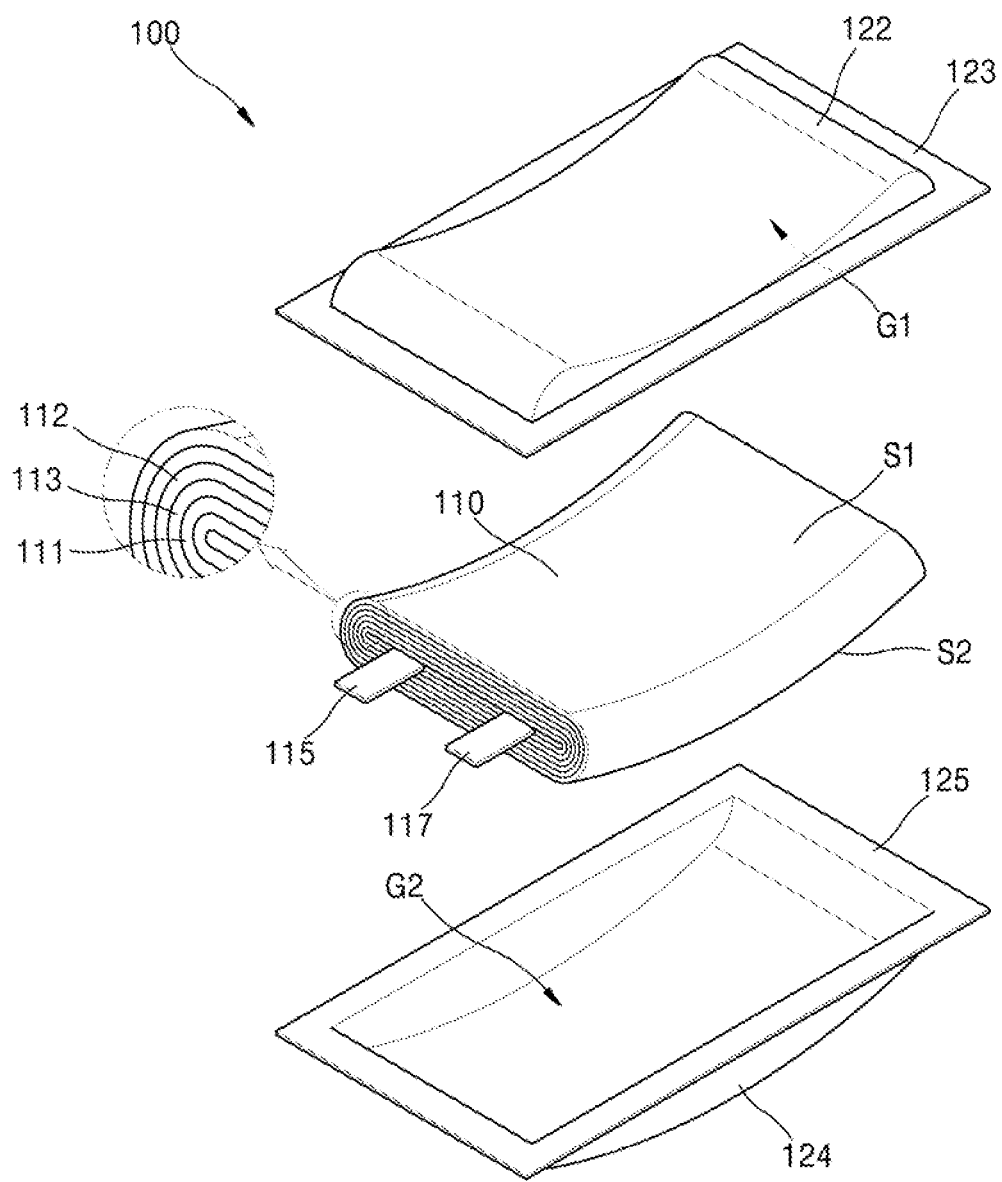
FIGS. 2A and 2B illustrate schematic disassembled perspective views of the curved secondary battery of FIG. 1.
Figure 2B:
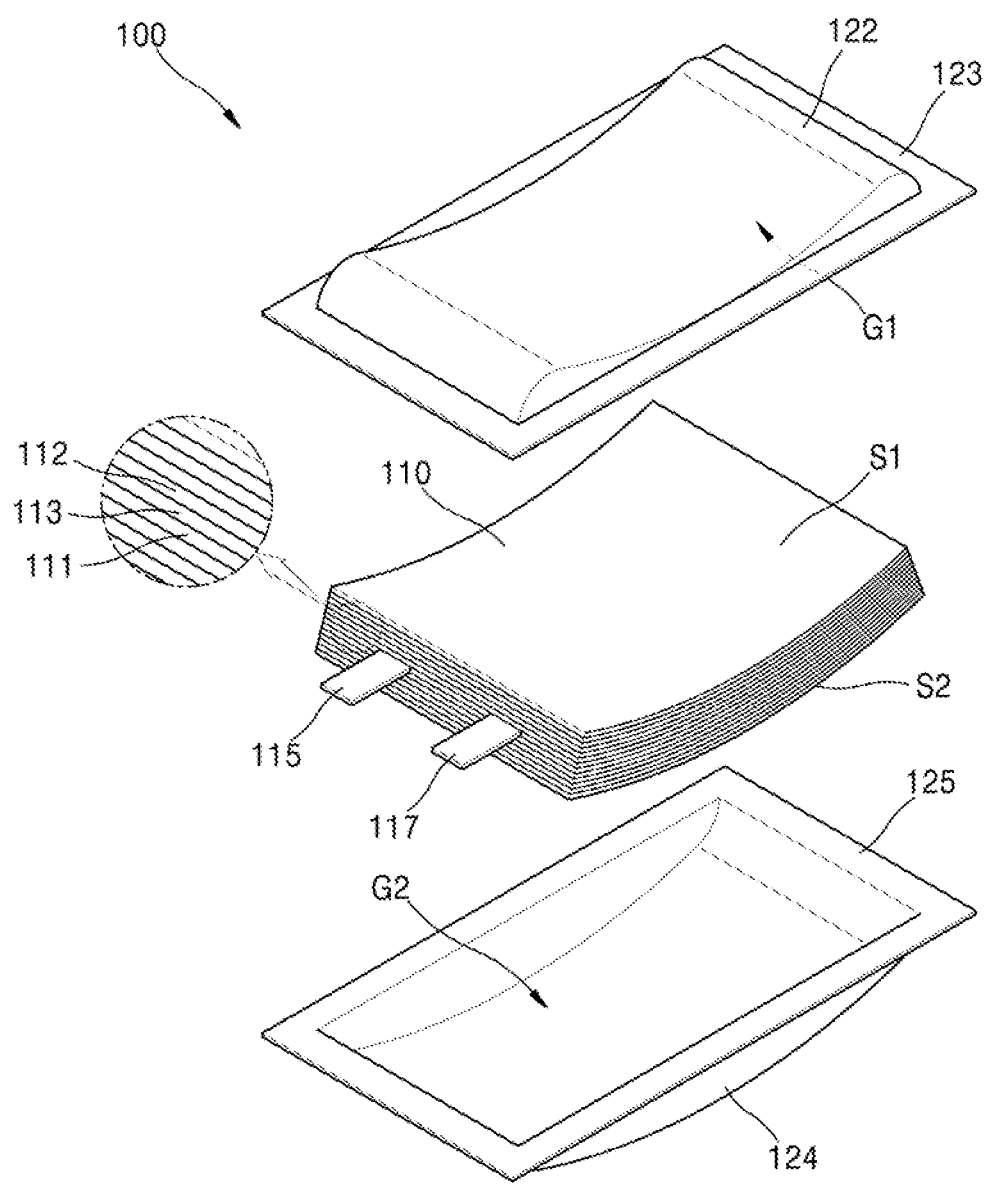

FIG. 1 illustrates a schematic perspective view of a curved secondary battery 100 according to an embodiment, and FIGS. 2A and 2B illustrate schematic disassembled perspective views of the curved secondary battery of FIG. 1.

Referring to FIGS. 1, 2A, and 2B, the curved secondary battery 100 may include an electrode assembly 110 and a pouch 120 that encapsulates or accommodates the electrode assembly 110.

The electrode assembly 110 may include a first electrode plate 111, a second electrode plate 112, and a separator 113 between the first electrode plate 111 and the second electrode plate 112. The electrode assembly 110 may be formed by sequentially and repeatedly stacking the first electrode plate 111, the separator 113, and the second electrode plate 112. In an implementation, the electrode assembly 110 may be manufactured by sequentially stacking the first electrode plate 111, the separator 113, and the second electrode plate 113 and winding these in a jelly-roll form.

The first electrode plate 111 may be one of a positive electrode film and a negative electrode film. If the first electrode plate 111 is a positive electrode film, the second electrode plate 112 may be a negative electrode film, or if the first electrode plate 111 is a negative electrode film, the second electrode plate 112 may be a positive electrode film. For example, the first electrode plate 111 and the second electrode plate 112 have electrically different polarities, and are not limited to a particular polarity.

The first electrode plate 111 may include a first active material portion (coated with a first active material) and a first uncoated portion (that is not coated with the first active material). The first active material portion may be formed by, e.g., coating a portion of a surface of an aluminum plate with a first active material, and the rest of the aluminum plate that is not coated with the first active materials may be the first uncoated portion. Examples of the first active material may include positive electrode active materials such as a lithium-containing transition metal oxide, e.g., $LiCoO_2$, $LiNiO_2$, $LiMnO_2$, or $LiMnO_4$ and a lithium chalcogenide compound.

The second electrode plate 112 may include a second active material portion (coated with a second active material) and a second uncoated portion (that is not coated with the second active material). The second active material portion may be formed by coating a portion of at least a surface of a copper plate with a second active material, and the rest of the copper plate that is not coated with the second active material may be a second uncoated portion. The second active material may be, e.g., a negative electrode active material. In an implementation, the second active material may be a carbon material, e.g., a crystalline carbon, an amorphous carbon, a carbon complex, or a carbon fiber, or a lithium metal or a lithium alloy.

The separator 113 may be a porous polymer layer including, e.g., polyethylene or polypropylene, or a woven fiber or a non-woven fiber including, e.g., a polymer fiber. Also, the separator 113 may include ceramic particles and/or may be formed of a polymer solid electrolyte.

The separator 113 may be formed of an independent film, or a non-conductive porous layer may be formed on the first electrode plate 111 or the second electrode plate 112 to be used as the separator 113. The separator 113 may be included to electrically separate the first electrode plate 111 and the second electrode plate 112, and the shape of the separator 113 may not be the same as the shape of the first electrode plate 111 or the second electrode plate 112.

A first electrode tab 115 and a second electrode tab 117 may be electrically connected to the electrode assembly 110. For example, the first electrode tab 115 may be attached to the first uncoated portion by, e.g., welding or the like, and the second electrode tab 117 may be attached to the second uncoated portion by, e.g., welding or the like. The first electrode tab 115 and the second electrode tab 117 may pass through an attaching portion 126 to be exposed to the outside.

The electrode assembly 110 may be disposed in a jig (not shown) that has a predetermined curvature, and the jig may be pressurized to form a bent or curved shape in the electrode assembly 110. For example, the electrode assembly 110 may include a first surface S1 that is concave and a second surface S2 that is convex. In an implementation, the electrode assembly 110 may have various shapes; e.g., a surface of the electrode assembly 110 may include both a concave portion and a convex portion according to the type of an electronic device in which the curved secondary battery 100 is to be mounted.

The pouch 120 may encapsulate or accommodate the electrode assembly 110, and may accommodate an electrolyte together with the electrode assembly 110. The pouch 120 may include a first encapsulation sheet 122 (on a first surface S1 of the electrode assembly 110), a second encapsulation sheet 124 (on a second surface S2 of the electrode assembly 110), and the attaching portion 126 (that is formed as a first boundary portion 123 of the first encapsulation sheet 122 and a second boundary portion 125 of the second encapsulation sheet 124 are attached to each other). For example, the first boundary portion 123 and the second boundary portion 125 may be thermally fused to form the attaching portion 126.

The first encapsulation sheet 122 and the second encapsulation sheet 124 may each have a three-layer structure formed of, e.g., a first insulation layer, a metal layer, and a second insulation layer. In an implementation, the metal layer may be formed of or include, e.g., aluminum, stainless steel, or the like, and the first insulation layer and the second insulation layer may be formed of or may include, e.g., casted polypropylene (CPP), polyethylene terephthalate (PET), nylon, or the like.

The first encapsulation sheet 122 may be on the first surface S1 of the electrode assembly 110 and may have a portion with the same curvature as the first surface S1. For example, the first encapsulation sheet 122 may include a first accommodation portion G1 (that accommodates a portion of the electrode assembly 110) and the first boundary portion 123 (that is planar and that extends outwardly from a peripheral portion of the first accommodation portion G1).

The first accommodation portion G1 may be formed by drawing the first encapsulation sheet 122 so that the first accommodation portion G1 has the same shape as a portion of the electrode assembly 110. For example, the first accommodation portion G1 may have a shape that is complementary to that of a facing portion of the curved electrode assembly to accommodate the portion of the curved electrode assembly 110 therein. For example, if the first surface S1 is concave, a depth of the first accommodation portion G1 may increase from a center to an outside thereof so that, e.g., a bottom of, the first accommodation portion G1 has the same curvature as the first surface S1. The outside refers to an outer portion with respect to a lengthwise direction of the curved secondary battery 100.

The second encapsulation sheet 124 may be disposed on the second surface S2 of the electrode assembly 110, and may have a portion with the same curvature as the second surface S2. For example, the second encapsulation sheet 124 may include a second accommodation portion G2 (that accommodates the rest of, e.g., remaining portions of other than the portions of the electrode assembly 110 accommodated in the first accommodation portion G1, the electrode assembly 110) and the second boundary portion 125 (that is planar and that extends outwardly from a peripheral portion of the second accommodation portion G2).

The second accommodation portion G2 may be formed by drawing the second encapsulation sheet 124 so that the second accommodation portion G2 has the same shape as the rest of the electrode assembly 110, e.g., the shape of the side of the electrode assembly 110 that is accommodated in the second accommodation portion G2. For example, the second accommodation portion G2 may have a shape that is complementary to that of a facing portion of the curved electrode assembly 110 to accommodate the portion of the curved electrode assembly 110 therein. For example, if the second surface S2 is convex, a depth of the second accommodation portion G2 may increase toward a center from the outside so that, e.g., a bottom of, the second accommodation portion G2 has the same curvature as the second surface S2. Here, the outside refers to an outer portion with respect to a length direction of the curved secondary battery 100.

In an implementation, the the first accommodation portion G1 may have the same or complementary shape as a portion of the electrode assembly 110 that is bent or curved, the second accommodation portion G2 has the same or complementary shape as the rest of or remaining portions of the electrode assembly 110, and the overall shape of the first accommodation portion G1 and the second accommodation portion G2 may be the same as or complementary to the shape of the electrode assembly 110. For example, the first accommodation portion G1 together with the second accommodation portion G2 may have a shape that is complementary to the shape of the curved electrode assembly 110 to accommodate the curved electrode assembly 110 therein.

Thus, the electrode assembly 110 may simply be accommodated in the first accommodation portion G1 and the second accommodation portion G2, and the curved secondary battery 100 may be easily formed by attaching the first boundary portion 123 and the second boundary portion 125 to each other.

In an implementation, the first accommodation portion G1 and the second accommodation portion G2 may be formed by drawing, and no wrinkles may be formed on the surfaces thereof. Thus, the curved secondary battery 100 may not include undesirable wrinkles on surfaces thereof.

Some curved secondary batteries may be formed by disposing a planar secondary battery in a jig, and then the jig may be pressurized to form a curvature in the secondary battery to form a curved secondary battery. Here, wrinkles, on which a stress may be concentrated, could be formed on a concave surface of the curved secondary battery, e.g., on the pouch, and damage such as tear pockets could be caused.

However, according to an embodiment, no wrinkles may be formed in the curved secondary battery 100, e.g., on the pouch, and damage to the pouch 120 due to stress concentration may be effectively prevented. During the manufacture of the curved secondary battery 100, even when a compression process for reducing a thickness of the curved secondary battery 100 is performed, damage to the electrode assembly 110 due to wrinkles of the pouch 120 may be prevented.

In an implementation, the electrode assembly 110 may be simultaneously accommodated both in the first accommodation portion G1 and the second accommodation portion G2, and a drawing processing depth in the first encapsulation sheet 122 and the second encapsulation sheet 124 may be reduced. If the electrode assembly 110 were to be accommodated either only in the first accommodation portion G1 or only in the second accommodation portion G2, the first accommodation portion G1 or the second accommodation portion G2 would be formed to have a depth corresponding to an entire thickness of the electrode assembly 110. Thus, a drawing processing depth could be increased, and cracks could be formed in the first encapsulation sheet 122 or the second encapsulation sheet 124. However, according to an embodiment, depths of the first accommodation portion G1 and the second accommodation portion G2 may be reduced, and damage to the first encapsulation sheet 122 and the second encapsulation sheet 124 during drawing may be prevented.

In an implementation, the attaching portion 126 may be formed by attaching the first boundary portion 123 and the second boundary portion 125 (which may both be planar), and the attaching portion 126 may be straight-lined or planar, rather than curved. Accordingly, a thermal fusing operation of forming the attaching portion 126 may be facilitated.

The attaching portion 126 may be disposed (e.g., in a plane) between the first surface S1 and the second surface S2 of the electrode assembly 110. For example, the attaching portion 126 may be formed at a same height as (e.g., roughly coplanar or aligned with) positions of the first electrode tab 115 and the second electrode tab 117, e.g., positions where the first electrode tab 115 and the second electrode tab 117 protrude from the electrode assembly 110.

As described above, the first electrode tab 115 and the second electrode tab 117 may pass through the attaching portion 126 to be exposed to the outside. Thus, if the first electrode tab 115 and the second electrode tab 117 are formed at the same height as, e.g., coplanar or aligned with, the attaching portion 126, the first electrode tab 115 and the second electrode tab 117 may pass through the attaching portion 126 and be exposed to the outside without being curved or bent in any portion thereof.

Accordingly, as an operation of curving the first electrode tab 115 and the second electrode tab 117 may be omitted, a manufacturing operation of the curved secondary battery 100 may be simplified, and damage to the first electrode tab 115 and/or the second electrode tab 117 due to curving may be prevented.

In an implementation, while not illustrated in the drawings, the attaching portion 126 may be curved or bent in a direction perpendicular to a length direction of the electrode assembly 110. For example, the attaching portion 126 may be formed along lateral surfaces of the curved secondary battery 100 to have a square or rectangular shape, and a portion of the attaching portion 126 at the two lateral surfaces of the curved secondary battery 100 may be curved or bent to be parallel with the lateral surfaces of the curved secondary battery 100, thereby reducing a width of the curved secondary battery 100. For example, the portions of the attaching portion 126 along opposing lateral sides of the curved secondary battery 100 may be bent upwardly or downwardly along the lateral surfaces of the curved secondary battery 100.

In an implementation, the first electrode tab 115 and the second electrode tab 117 may be withdrawn in the same direction as a curvature direction of the electrode assembly 110. For example, the first electrode tab 115 and the second electrode tab 117 may be withdrawn in a direction perpendicular to the curvature direction of the electrode assembly 110. In an implementation, the electrode assembly 110 may be bent or curved in a lengthwise direction thereof (as shown in FIGS. 2A and 2B), and the electrode assembly 110 may also have a bent or curved shape along a width direction thereof.

Figure 3:
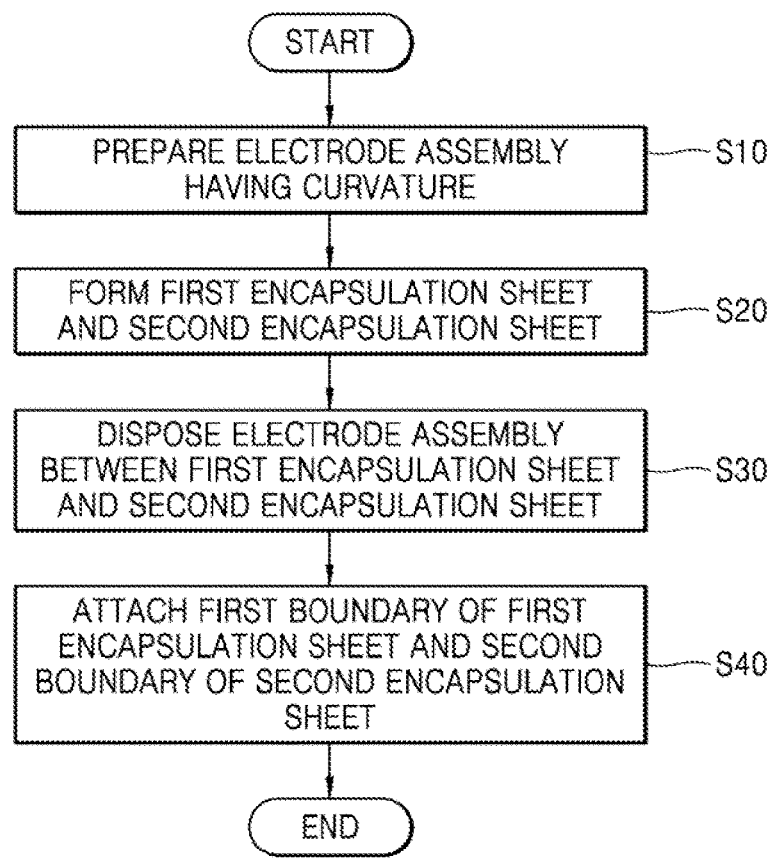
FIG. 3 illustrates a flowchart of a method of manufacturing a curved secondary battery according to an embodiment.

FIG. 3 illustrates a flowchart of a method of manufacturing a curved secondary battery 100 according to an embodiment.

Hereinafter, when referring to FIGS. 1 through 3 together, the method of manufacturing the curved secondary battery 100 may include preparing an electrode assembly 110 having curvature (operation S10), forming a first encapsulation sheet 122 and a second encapsulation sheet 124 (operation S20), disposing the electrode assembly 110 between the first encapsulation sheet 122 and the second encapsulation sheet 124 (operation S30), and attaching a first boundary portion 123 of the first encapsulation sheet 122 and a second boundary portion 125 of the second encapsulation sheet 124 to each other (operation S40).

The electrode assembly 110 may be formed, e.g., by sequentially and repeatedly stacking a first electrode plate 111, a separator 113, and a second electrode plate 112. A first electrode tab 115 and a second electrode tab 117 may be electrically connected to the electrode assembly 110, and the electrode assembly 110 may be located in a jig (not shown) having a predetermined curvature. The jig may be pressurized to form the electrode assembly 110 having a bent or curved shape, e.g., the jig may press the electrode assembly 110 to provide the curved electrode assembly 110.

The first encapsulation sheet 122 may be formed to have a portion with the same or complementary shape as a first surface S1 of the curved electrode assembly 110. For example, the first encapsulation sheet 122 may include a first accommodation portion G1 that has a concave shape to accommodate a portion of the electrode assembly 110.

The first accommodation portion G1 may be formed by, e.g., drawing. For example, the first accommodation portion G1 may be formed by placing the first encapsulation sheet 122 on a die that is engraved to have a same or complementary shape as a portion of the electrode assembly 110, and then lowering a punch having a shape corresponding or complementary to the engraving into the engraving and pressurizing the punch.

The second encapsulation sheet 124 may be formed to have a portion with the same or complementary shape as a second surface S2 of the curved electrode assembly 110. For example, the second encapsulation sheet 124 may include a second accommodation portion G2 having a concave shape to accommodate the rest of the electrode assembly 110. The second accommodation portion G2 may also be formed by drawing like the first accommodation portion G1.

Figure 4:
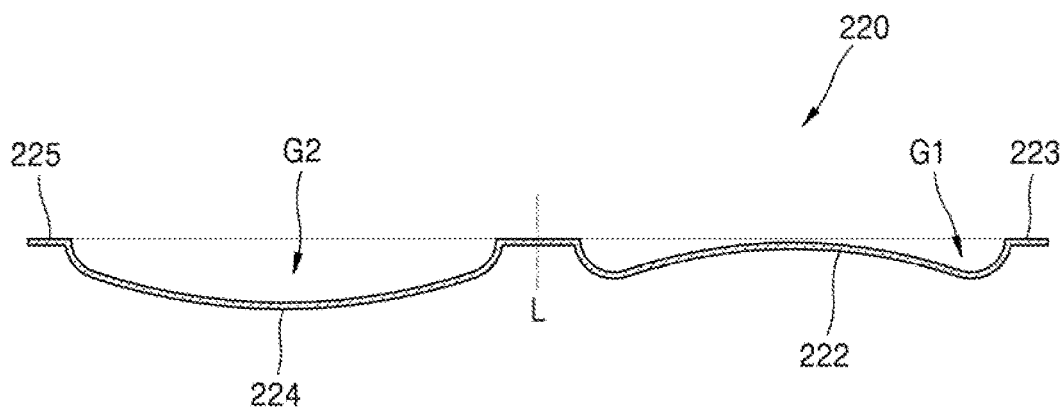
FIG. 4 illustrates a schematic cross-sectional view of a pouch of the curved secondary battery of FIG. 1 according to another embodiment.

FIG. 4 illustrates a schematic cross-sectional view of a pouch 220 of the curved secondary battery of FIG. 1 according to another embodiment.

In an implementation, the first encapsulation sheet 122 and the second encapsulation sheet 124 may be separately formed. In another implementation, e.g., as illustrated in FIG. 4, a pouch 220 may have a structure in which a first encapsulation sheet 222 and a second encapsulation sheet 224 are continuously formed.

After forming the first encapsulation sheet 122 and the second encapsulation sheet 124, the electrode assembly 110 may be located or disposed between the first encapsulation sheet 122 and the second encapsulation sheet 124. For example, the electrode assembly 110 may be first located or disposed in the first accommodation portion G1, and then the second encapsulation sheet 124 may be disposed on the first encapsulation sheet 122 such that the first encapsulation sheet 122 and the second encapsulation sheet 124 overlap with each other. Accordingly, the rest of the electrode assembly 110 may be accommodated in the second accommodation portion G2. The first boundary portion 123 and the second boundary portion 125 may be attached to each other, and the first electrode tab 115 and the second electrode tab 117 may be exposed to the outside between the first boundary portion 123 and the second boundary portion 125.

Next, by thermally fusing the first boundary portion 123 and the second boundary portion 125, the curved secondary battery 100 may be formed. The first boundary portion 123 and the second boundary portion 125 may be attached to each other to form the attaching portion 125 which is straight-lined or planar, rather than curved like the overall shape of the curved secondary battery 100. Also, the attaching portion 126 may be disposed (e.g., in a plane)

between the first surface S1 and the second surface S2 of the electrode assembly 110, and may be formed at the same height as (e.g., coplanar or aligned with) positions of the first electrode tab 115 and the second electrode tab 117, so that the first electrode tab 115 and the second electrode tab 117 may be exposed to the outside without being curved or bent.

In an implementation, the attaching portion 126, which may be planar, may be curved or bent in a direction perpendicular to a length direction of the electrode assembly 110. The curved secondary battery 100 already has a curvature (e.g., is pre-curved) the attaching portion 126 may be bent from a planar shape, and the attaching portion 126 may be easily curved or bent, e.g., may be bent along a straight line without being curved.

In some instances, if an attaching portion were to be curved in parallel to or with a same curvature as a surface of a secondary battery when forming a curvature in the secondary battery, stress could be generated in the attaching portion. However, according to the embodiments, the attaching portion 126, which may be planar (e.g., due to the pre-curving of the electrode assembly 110), may be bent. Thus, no curvature may be formed in the attaching portion 126, e.g., the attaching portion 126 may extend along a straight, rather than curved, line, thereby preventing stress from being generated in the attaching portion 126.

In an implementation, the first accommodation portion G1 and the second accommodation portion G2 may be respectively formed in the first encapsulation sheet 122 and the second encapsulation sheet 124 by drawing, and no wrinkles may be formed in the first encapsulation sheet 122 and the second encapsulation sheet 124. Thus, no wrinkles may be formed in an external surface of the curved secondary battery 100.

In an implementation, the electrode assembly 110 may be accommodated at the same time both in the first accommodation portion G1 and the second accommodation portion G2, and a drawing processing depth in each of the first encapsulation sheet 122 and the second encapsulation sheet 124 may be reduced.

Referring to FIG. 4, the pouch 220 may include a first encapsulation sheet 222 (including a first accommodation groove G1) and a second encapsulation sheet 224 (including a second accommodation groove G2). The first encapsulation sheet 222 may include a first boundary portion 223 (that is planar and that extends outwardly from a peripheral portion of the first accommodation groove G1), and the second encapsulation sheet 224 may include a second boundary portion 225 (that is planar and that extends outwardly from a peripheral portion of the second accommodation groove G2).

A side of the first encapsulation sheet 222 may be continuous with a side of the second encapsulation sheet 224. For example, the first accommodation groove G1 and the second accommodation groove G2 may be sequentially formed at separate positions in a single encapsulation sheet by drawing, and the first boundary portion 223 at the side of the first encapsulation sheet 222 and the second boundary portion 225 at the side of the second encapsulation sheet 224 may be formed as a single body. In an implementation, the side of the first encapsulation sheet 222 and the side of the second encapsulation sheet 224 that are continuous with each other may form a folding line L.

For example, in contrast to a portion of the electrode assembly 110 (FIGS. 2A and 2B) being accommodated in the first accommodation portion G1, if the first encapsulation sheet 222 and the second encapsulation sheet 224 are folded with respect to the folding line L such that the second encapsulation sheet 224 is disposed on the first encapsulation sheet 222, the rest of the electrode assembly 110 may be accommodated in the second accommodation portion G2, and the first boundary portion 223 and the second boundary portion 225 may abut against each other. In this state, by attaching the first boundary portion 223 and the second boundary portion 225, the curved secondary battery 100 (FIG. 1) may be easily formed.

By way of summation and review, wearable devices that use a secondary battery as a power supply and applications thereof have been developed. In addition, electronic devices such as mobile phones and laptop computers have been designed to have a predetermined curved surface for ergonomic reasons. Thus, secondary batteries for use in such electronic devices may also have a curved surface in accordance with the shape of the electronic devices.

As described above, according to the one or more of the above embodiments, undesirable wrinkles in the external appearance of the curved secondary battery may be prevented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A curved secondary battery, comprising:
an electrode assembly having a curved shape; and
a pouch that accommodates the electrode assembly, wherein the pouch includes:
a first encapsulation sheet on a curved first surface of the electrode assembly, the first encapsulation sheet having a first accommodation portion having a first curved surface with a same curvature as the first surface and first sides surrounding the first curved surface;
a second encapsulation sheet on a curved second surface of the electrode assembly, the second encapsulation sheet having a second accommodation portion having a second curved surface with a same curvature as the second surface and second sides surrounding the second curved surface; and
a two-piece attaching portion that has a planar flange shape, the attaching portion including a first planar boundary portion extending outwardly from all first sides of the first accommodation portion and a second planar boundary portion extending outwardly from all second sides of the second accommodation portion, the first planar boundary portion being attached to the second planar boundary portion.

2. The curved secondary battery as claimed in claim 1, wherein the attaching portion is in a plane between the first surface of the electrode assembly and the second surface of the electrode assembly.

3. The curved secondary battery as claimed in claim 1, wherein the first accommodation portion and the second accommodation portion have a shape complementary to that of the electrode assembly.

4. The curved secondary battery as claimed in claim 1, wherein the attaching portion is bent in a direction perpendicular to a lengthwise direction of the electrode assembly.

5. The curved secondary battery as claimed in claim 1, further comprising a first electrode tab and a second electrode tab that are electrically connected to the electrode assembly, wherein:
the first electrode tab and the second electrode tab pass through the attaching portion to be exposed to the outside, and
the first electrode tab and the second electrode tab protrude from the electrode assembly at a position that is aligned with the attaching portion.

6. The curved secondary battery as claimed in claim 5, wherein:
the electrode assembly includes a first electrode plate, a second electrode plate, and a separator between the first electrode plate and the second electrode plate,
the first electrode tab is attached to the first electrode plate, and
the second electrode tab is attached to the second electrode plate.

7. The curved secondary battery as claimed in claim 1, wherein a side of the first encapsulation sheet is continuous with a side of the second encapsulation sheet.

8. A method of manufacturing the curved secondary battery as claimed in claim 1, the method comprising:
preparing the electrode assembly such that the electrode assembly has a curvature;
forming the first encapsulation sheet that has the portion with the same curvature as the curved first surface of the electrode assembly;
forming the second encapsulation sheet that has the portion with the same curvature as the curved second surface of the electrode assembly;
disposing the electrode assembly between the first encapsulation sheet and the second encapsulation sheet; and
attaching the first boundary portion of the first encapsulation sheet and the second boundary portion of the second encapsulation sheet,
wherein the attaching portion is formed when the first boundary portion and the second boundary portion are attached to each other.

9. The method as claimed in claim 8, wherein the attaching portion is in a plane between the first surface of the electrode assembly and the second surface of the electrode assembly.

10. The method as claimed in claim 8, wherein:
forming the first encapsulation sheet includes forming a first accommodation portion thereon,
forming the second encapsulation sheet includes forming a second accommodation portion thereon, and
disposing the electrode assembly between the first encapsulation sheet and the second encapsulation sheet includes accommodating the electrode assembly in the first accommodation portion and the second accommodation portion.

11. The method as claimed in claim 10, wherein the first accommodation portion and the second accommodation portion have a shape complementary to that of the electrode assembly.

12. The method as claimed in claim 10, wherein:
the first boundary portion extends outwardly from a peripheral portion of the first accommodation portion to the outside, and
the second boundary portion extends outwardly from a peripheral portion of the second accommodation portion.

13. The method as claimed in claim 12, further comprising bending the attaching portion in a direction perpendicular to a lengthwise direction of the electrode assembly.

14. The method as claimed in claim 8, wherein:
the electrode assembly includes a first electrode plate, a second electrode plate, and a separator between the first electrode plate and the second electrode plate,
a first electrode tab is attached to the first electrode plate, and
a second electrode tab is attached to the second electrode plate.

15. The method as claimed in claim 14, wherein the first electrode tab and the second electrode tab protrude from the electrode assembly at a position that is aligned with the attaching portion.

16. The method as claimed in claim 8, wherein a side of the first encapsulation sheet is continuous with a side of the second encapsulation sheet.

17. The method as claimed in claim 16, wherein:
the side of the first encapsulation sheet and the side of the second encapsulation sheet form a folding line, and
the first encapsulation sheet and the second encapsulation sheet are folded with respect to the folding line such that the first encapsulation sheet and the second encapsulation sheet overlap each other.

18. The method as claimed in claim 8, wherein attaching the first boundary portion and the second boundary portion includes thermally fusing the first boundary portion of the first encapsulation sheet and the second boundary portion of the second encapsulation sheet.

* * * * *